(12) United States Patent
Kong et al.

(10) Patent No.: US 11,664,515 B1
(45) Date of Patent: May 30, 2023

(54) METHANOL SOLID OXIDE FUEL CELL AND POWER GENERATION SYSTEM COMPRISING THE SAME

(71) Applicant: JIANGSU UNIVERSITY OF SCIENCE AND TECHNOLOGY, Jiangsu (CN)

(72) Inventors: Wei Kong, Jiangsu (CN); Si Yu Lu, Jiangsu (CN); Man Zhang, Jiangsu (CN); Leitao Han, Jiangsu (CN); Alexei Levtsev, Jiangsu (CN); Andrey Makeev, Jiangsu (CN); Anatoly Lysyakov, Jiangsu (CN)

(73) Assignee: JIANGSU UNIVERSITY OF SCIENCE AND TECHNOLOGY, Jiangsu (CN)

( * ) Notice: Subject to any disclaimer, the term of this patent is extended or adjusted under 35 U.S.C. 154(b) by 20 days.

(21) Appl. No.: 17/571,567

(22) Filed: Jan. 10, 2022

(30) Foreign Application Priority Data

Nov. 26, 2021 (CN) .......................... 202111421328.7

(51) Int. Cl.
*H01M 8/0612* (2016.01)
*H01M 8/04014* (2016.01)
*H01M 8/243* (2016.01)
*H01M 8/12* (2016.01)

(52) U.S. Cl.
CPC ..... *H01M 8/0625* (2013.01); *H01M 8/04022* (2013.01); *H01M 8/243* (2013.01); *H01M 2008/1293* (2013.01)

(58) Field of Classification Search
None
See application file for complete search history.

(56) References Cited

U.S. PATENT DOCUMENTS

| 4,520,082 A | * | 5/1985 | Makiel | .................. | H01M 8/243 |
|---|---|---|---|---|---|
| | | | | | 429/460 |
| 5,158,837 A | * | 10/1992 | Misawa | .............. | H01M 8/1231 |
| | | | | | 429/513 |
| 5,589,286 A | * | 12/1996 | Iwata | .................. | H01M 8/2418 |
| | | | | | 429/465 |

\* cited by examiner

*Primary Examiner* — Haroon S. Sheikh
(74) *Attorney, Agent, or Firm* — JCIPRNET

(57) ABSTRACT

The present invention provides a methanol solid oxide fuel cell and a power generation system comprising the same, wherein the fuel cell is a tubular SOFC cell stack, the tubular SOFC cell stack comprises a plurality of tubular SOFC single cells, and a side wall of an inner pipe of the tubular SOFC single cell at a fuel inlet is of a porous layer structure; an inner wall of the inner pipe is coated with a methanol pyrolysis catalyst layer, and the thickness of the catalyst layer gradually increases along a moving direction of the fuel in the inner pipe. The methanol solid oxide fuel cell can effectively relieve carbon deposition of the anode of the methanol SOFC, and can ensure that the temperature of the whole cell is more uniform and the cell performance is more stable.

10 Claims, 11 Drawing Sheets

METHANOL SOLID OXIDE FUEL CELL AND POWER GENERATION SYSTEM COMPRISING THE SAME

CROSS-REFERENCE TO RELATED APPLICATION

This application claims the priority benefit of China application serial no. 202111421328.7, filed on Nov. 26, 2021. The entirety of the above-mended patent application is hereby incorporated by reference here and made a part of this specification.

BACKGROUND

Technical Field

The present invention relates to a solid oxide fuel cell using methanol as a fuel, and also relates to a power generation system comprising the same.

Description of Related Art

Solid oxide fuel cells (SOFCs) are much favored for their high energy conversion efficiency, flexible fuel selection, stable solid state electrolyte, relatively high power density and the like. The power generation efficiency of SOFC is generally between 43% and 55%, and the remaining energy is dissipated in the form of heat. The SOFC requires high working temperature (600° C.-1000° C.), so the generated waste heat has high utilization value and can be fully utilized, thereby further improving energy utilization and reducing emission.

There are rich fuels of solid oxide fuel cells for options. Among them, hydrogen is the most ideal fuel for solid oxide fuel cells (SOFCs). However, as a secondary energy source, hydrogen is not directly available and its storage and transportation technology is not yet mature, which leads to high cost. Therefore, solid oxide fuel cells using methanol as a fuel have received increasing attention from various national researchers. Compared with the solid oxide fuel cell using $H_2$ as a fuel, the methanol solid oxide fuel cell has the following advantages: (1) the methanol is widely available and convenient to store and transport; and (2) methanol does not require the establishment of new fuel infrastructure like hydrogen, such as hydrogen stations, hydrogen plants and the like. However, research on solid oxide fuel cells using methanol as a fuel is not yet mature currently. Compared with hydrogen, the problem of carbon deposition caused by using methanol as a fuel cannot be avoided, particularly for SOFC using Ni as an anode, Ni is the most widely used electrochemical catalyst for SOFC, but Ni is also a good catalyst for hydrocarbon cracking reaction, and carbon deposition mainly occurs on a metal Ni cluster consisting of several adjacent Ni atoms. Many researchers found that carbon deposition mainly occurred on an anode surface at a fuel inlet. Therefore, carbon deposition is one of the key problems which hinder the development of methanol solid oxide fuel cells.

SUMMARY

Objectives: An objective of the present invention is to provide a solid oxide fuel cell which can effectively relieve carbon deposition on the anode of a methanol SOFC; another objective of the present invention is to provide a power generation system comprising the same.

Technical solution: The methanol solid oxide fuel cell provided by the present invention is a tubular SOFC cell stack, the tubular SOFC cell stack comprises a plurality of tubular SOFC single cells, a side wall of an inner pipe of the tubular SOFC single cell at a fuel inlet is of a porous layer structure, the porous layer pipe is a hollow pipe, only the side wall of the pipe is of the porous layer structure, a side wall of the porous layer is of a porous layer with a porosity of 0.5, the side wall is similar to a sponge structure in shape but is hard, and the thickness of the side wall of the porous layer is 2 mm.

Wherein, an inner wall of the inner pipe is coated with a methanol pyrolysis catalyst layer, and the thickness of the catalyst layer gradually increases along a moving direction of the fuel in the inner pipe.

Wherein, the tubular SOFC cell stack further comprises a fuel inlet cavity, a fuel outlet cavity, an air cavity and an air buffer cavity; a fuel inlet of an inner pipe of the tubular SOFC single cell extends into the fuel inlet cavity; the fuel inlet cavity is arranged above the fuel outlet cavity, and a fuel outlet pipe is arranged at the tail end of a corresponding concentric-square-shaped partition plate; the fuel cell further comprises a concentric-square-shaped partition plate, a fuel inlet pipe is communicated with the central cavity of the concentric-square-shaped partition plate, fuel mixed gas along the concentric-square-shaped partition plate enters the inner pipe of each tubular SOFC single cell and sequentially enters an anode functional layer to participate in anode electrochemical reaction, and the reacted gas is discharged from a cavity at an outer side of the inner pipe and discharged from the fuel outlet pipe along a concentric-square-shaped flow channel formed by the concentric-square-shaped partition plate; a porous partition plate is arranged between the air buffer cavity and the air cavity, the air buffer cavity is communicated with an air inlet pipe, the air cavity is provided with an air outlet pipe, a cathode at an outer side of the tubular SOFC single cell is located in the air cavity, and air uniformly enters the air cavity to participate in cathode electrochemical reaction and then is discharged from the air outlet pipe at the periphery of the air cavity.

A power generation system comprising the methanol solid oxide fuel cell provided by the present invention comprises a tubular SOFC cell stack, a fuel feeding pipeline connected with a fuel inlet of the tubular SOFC cell stack, an air feeding pipeline connected with an air inlet of the tubular SOFC cell stack, a treatment pipeline for exhaust gas on a fuel side and a heat recovery pipeline for exhaust air on an air side.

Wherein, the fuel feeding pipeline sequentially comprises a methanol tank, a primary mixer, a methanol evaporator, a heat exchanger I and a secondary mixer; a water pump I and a flow control valve I are arranged on a connecting pipeline between the methanol tank and the primary mixer, water and methanol are mixed by the primary mixer and then pumped into the methanol evaporator through a water pump II, the methanol steam obtained by the methanol evaporator is mixed with CO and H2 in the secondary mixer after passing through the heat exchanger I, and the mixed fuel enters the tubular SOFC cell stack through a flow control valve II.

Wherein, the mixing volume ratio of water to methanol is 1:9.

Wherein, the methanol evaporator comprises a methanol solution tank connected with an outlet of the primary mixer, an air cavity positioned above the methanol solution tank and a methanol steam collecting cavity positioned above the air cavity and separated from the air cavity by a barrier; the methanol evaporator also comprises a plurality of rising-film evaporation tubes, wherein inlet ends of the rising-film evaporation tubes extend into the methanol solution tank, the rising-film evaporation tubes pass through the air cavity, and outlet ends of the rising-film evaporation tubes extend into the methanol steam collection cavity; the air cavity comprises a hot air inlet and a cold air outlet, the hot air inlet is close to the inlet end of the rising-film evaporation tube, and the cold air outlet is far away from the inlet end of the rising-film evaporation tube; the methanol steam collection cavity comprises a methanol steam outlet; the rising-film evaporation pipe comprises a pipe and a porous section inserted into the pipe, the upper half part of the porous section is located in the pipe, the lower half part of the porous section extends into the methanol solution tank, and the upper half part of the porous section is positioned at a position where a hot air inlet is correspondingly arranged on the air cavity; an outer side wall of the upper half part of the porous section is provided with annular ribs.

Wherein, the air feeding pipeline comprises a blower and at least a primary heat exchanger, the blower presses air into multi-stage heat exchangers connected in series for continuously heating the air, and the heated air enters the tubular SOFC cell stack through a flow control valve III.

Wherein, the mixed gas discharged from the fuel side firstly enters a heat exchanger III to heat the air in the air feeding pipeline, then enters the heat exchanger I to heat methanol steam, and enters a cooling tower after heat exchange to separate $H_2O$ in the mixed gas, and the separated water is collected by a water tank; the water in the water tank may enter the primary mixer through a water pump III and a flow control valve IV to be mixed with methanol; the remaining mixed gas of $CO_2$, CO and $H_2$ enters a magnesium powder combustion furnace after $H_2O$ is separated, wherein $CO_2$ and magnesium powder are combusted, and the mixed gas of CO and $H_2$ discharged after combustion is introduced into the secondary mixer to be mixed with the methanol steam, so that the recycling of residual fuel is realized.

Wherein, the magnesium powder combustion furnace comprises a reaction cavity consisting of a plurality of layers of combustion chambers, a spark plug is arranged within each layer of combustion chamber, adjacent layers of combustion chambers are separated by a porous partition plate, the porous partition plate is connected with rotating shafts passing through out of a side wall of the combustion chamber, and the rotating shaft is fixedly connected with the side wall of the combustion chamber through a bearing; the top of the reaction cavity is provided with a magnesium powder feeding inlet and an air outlet, a valve I is arranged at the feeding inlet, and a valve IV is arranged at the air outlet; the bottom of the reaction cavity is provided with a powder recovery tank, a valve III is arranged between the reaction cavity and the powder recovery tank, a mixed gas inlet is arranged on a side wall of the lower portion of the reaction cavity, and a valve II is arranged at the mixed gas inlet.

Wherein, after reaction, high-temperature air discharged from an air outlet of the tubular SOFC cell stack firstly enters normal-temperature air pressed by heating the blower in a heat exchanger II, then enters the methanol evaporator to heat methanol solution, and cooled air is discharged from the cold air outlet, so that the waste heat utilization of the high-temperature air in the tubular SOFC cell stack is realized.

Methanol rapidly undergoes decomposition reaction (Ni is a catalyst for hydrocarbon cracking reaction) when contacting with an anode, producing $H_2$ and CO. Therefore, high-concentration CO is enriched at an anode corresponding to a fuel outlet end of the inner pipe, and a low-temperature zone may be formed at the anode because a large amount of heat may be absorbed by methanol pyrolysis, and the high-concentration CO and the low-temperature zone enable a strong carbon deposition active zone to be concentrated at the top of the anode.

The methanol pyrolysis produces CO and $H_2$, the CO and $H_2$ are actual fuels participating in the anode electrochemical reaction, and chemical equation is as follows: $CH_3OH=CO+2H_2$. $H_2$ produces $H_2O$ when undergoing electrochemical reaction, $H_2O$ undergoes water-gas shift reaction with CO, and the chemical equation is as follows: $CO+H_2O=CO_2+H_2$.

Beneficial effects: Compared with the prior art, the present invention has significant effects as follows: 1. the side wall of the inner pipe of the tubular SOFC single cell at the fuel inlet is of a porous layer structure, so that fuel can be dispersed out of the inner pipe along the porous layer structure at the fuel inlet, anode carbon deposition of the methanol SOFC can be effectively relieved; if the side wall of the inner pipe at the fuel inlet is closed, high-concentration methanol at the outlet end of the inner pipe is largely decomposed and absorbs a large amount of heat, a low-temperature zone is formed at the top of the anode and carbon deposition is easy to occur; when the side wall of the inner pipe at the fuel inlet is of a porous layer structure, part of fuel directly seeps out of the outer cavity of the inner pipe through the porous layer to participate in anode reaction, because the position where the fuel participates in the reaction is in the latter half of the cell reaction and has higher temperature, the temperature of the position can be reduced by absorbing heat through methanol pyrolysis, and the temperature difference of the whole cell is reduced; meanwhile, enough $H_2O$ and $CO_2$ are produced at that position, the carbon deposition is not caused, on the other hand, the concentration of the methanol at the outlet end of the inner pipe can be reduced, the concentration of methanol entering the end part of the circular tube is reduced, the methanol decomposition reaction rate is reduced, the CO concentration is reduced, the heat absorption is reduced, the temperature drop is reduced, and the carbon deposition caused by low temperature is relieved while the temperature difference of the whole cell is reduced. 2. The inner wall of the inner pipe of the tubular SOFC single cell is coated with a methanol pyrolysis catalyst layer, and the thickness of the catalyst layer gradually increases from top to bottom; after entering the inner pipe, methanol undergoes pyrolysis reaction under the action of a methanol pyrolysis catalyst, the methanol concentration is gradually reduced, the reaction rate of the methanol on the surface of the whole inner pipe is balanced by gradually increasing the thickness of the catalyst layer, and a low-temperature zone formed by absorbing heat through the decomposition of the high-concentration methanol on the top of the anode is synergistically avoided, so that the objectives of reducing the temperature difference of the cell, relieving carbon deposition and improving cell performance are realized. 3. The power generation system of the present invention realizes the recovery of CO and $H_2$ in the discharged gas at a combustion side, can reduce the proportion of methanol in the fuel mixed gas, and can also synergistically reduce carbon deposition, and methanol content is reduced, so that the heat absorbed through methanol decomposition is reduced, and the temperature of the cell is more uniform. 4. The power generation system of the present invention realizes the recovery of $H_2O$ in the discharged gas at the combustion side, and can greatly relieve carbon deposition on the premise of not influencing the performance of a cell stack by doping a small amount of water into the initial fuel; $H_2O$ can undergo water-gas shift reaction with CO produced by methanol pyrolysis, and because the side wall of the inner pipe at the fuel inlet in the cell is provided with a plurality of through holes, the objective of greatly reducing carbon deposition can be realized only by doping a small amount of water into the methanol. 5. The power generation system of the present invention can completely recover carbon dioxide in the discharged gas at the combustion side, the carbon dioxide and the MgO/C composite material produced by full combustion of the carbon dioxide and Mg powder can be used for removing phosphate, and heat generated by combustion is also used for generating power for Stirling engine. 6. The power generation system of the present invention realizes the effective utilization of the waste heat of the high-temperature gas discharged by the tubular SOFC cell stack, and is used for preheating the air at normal temperature and evaporating methanol, thereby improving the energy utilization rate of the whole system.

DESCRIPTION OF THE EMBODIMENTS

As shown in FIGS. 1-9, the solid oxide fuel cell using methanol as fuel of the present invention is a tubular SOFC cell stack 14, the tubular SOFC cell stack 14 comprises a plurality of tubular SOFC single cells 1413, a side wall of an inner pipe 1416 of the tubular SOFC single cell 1413 at a fuel inlet of a cell reaction zone is a porous layer structure 1417, a side wall of the porous layer is a side wall of a porous layer with a porosity of 0.5, the side wall is similar to a sponge structure in shape but is hard, and the thickness of the side wall of the porous layer is 2 mm; an inner wall of the inner pipe 1416-2 (excluding the pipe with the side wall coated with a porous layer) is coated with a methanol pyrolysis catalyst layer, and the thickness of the catalyst layer gradually increases along a moving direction of the fuel in the inner pipe.

In the conventional structure (the side wall of the inner pipe at the fuel inlet is closed), the cell temperature gradually increases, and the temperature difference between two ends of the cell is large. The porous layer divides the inlet fuel, the concentration of methanol at the top of the anode is reduced, the methanol decomposition reaction rate is slowed down, and the absorbed heat is reduced, so that the temperature at the top of the anode is improved compared with that of the conventional structure, the carbon deposition caused by too low temperature at the top of the cell is effectively relieved, the heat is absorbed by methanol decomposition at the bottom of the anode, the temperature of the cell is effectively prevented from further increasing, the maximum temperature difference of the cell is greatly reduced, and a more uniform temperature field ensures the stable operation of the cell.

Figure 1:
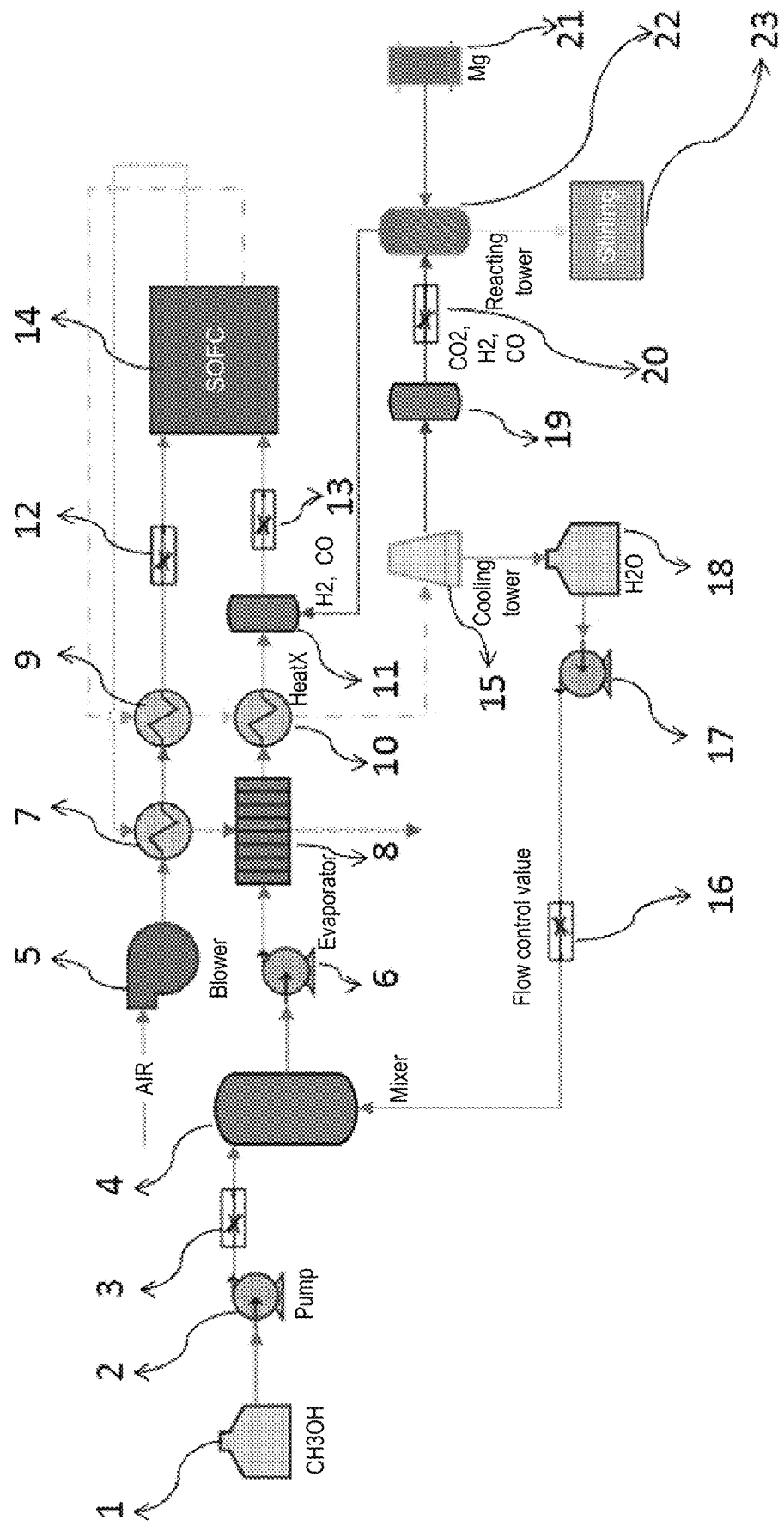
FIG. 1 is a system schematic diagram of the power generation system according to the present invention.
Figure 2:
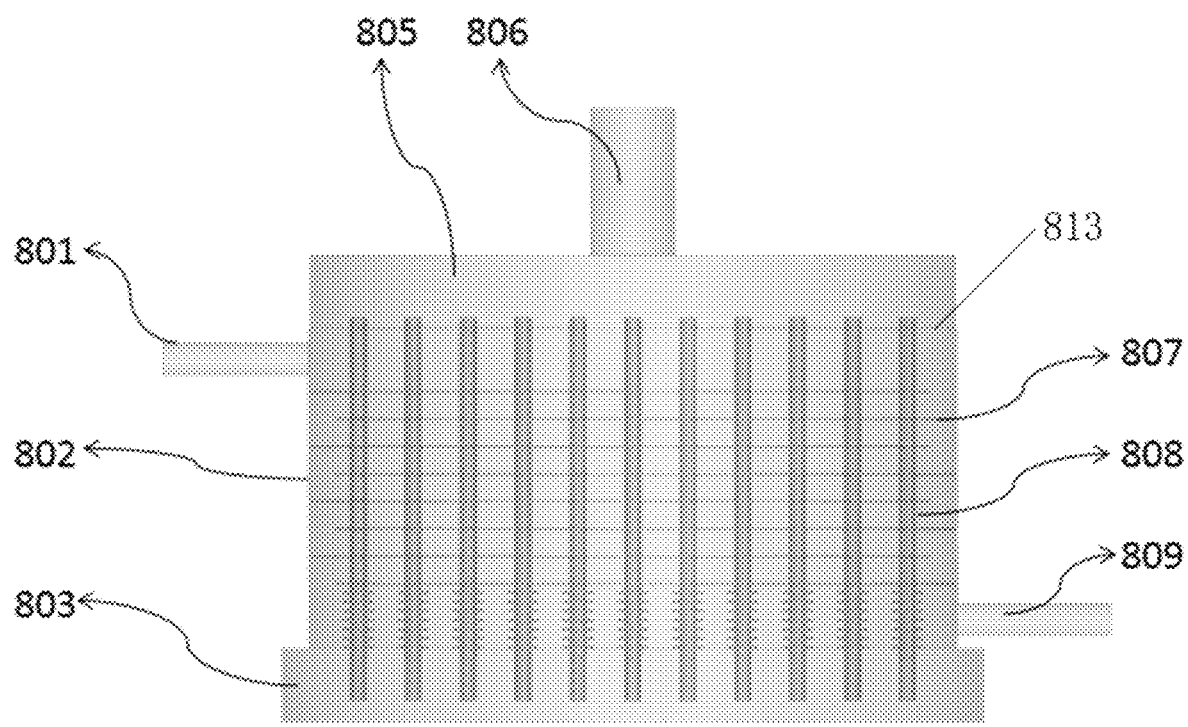
FIG. 2 is a schematic diagram of the structure of the methanol evaporator.
Figure 3:
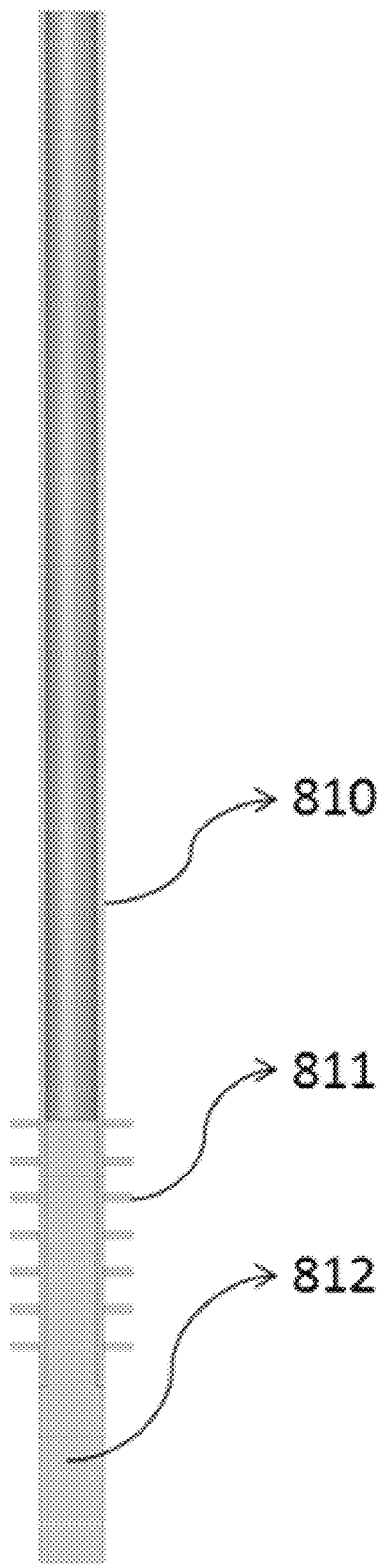
FIG. 3 is a schematic diagram of the structure of the rising-film evaporation tube.
Figure 4:
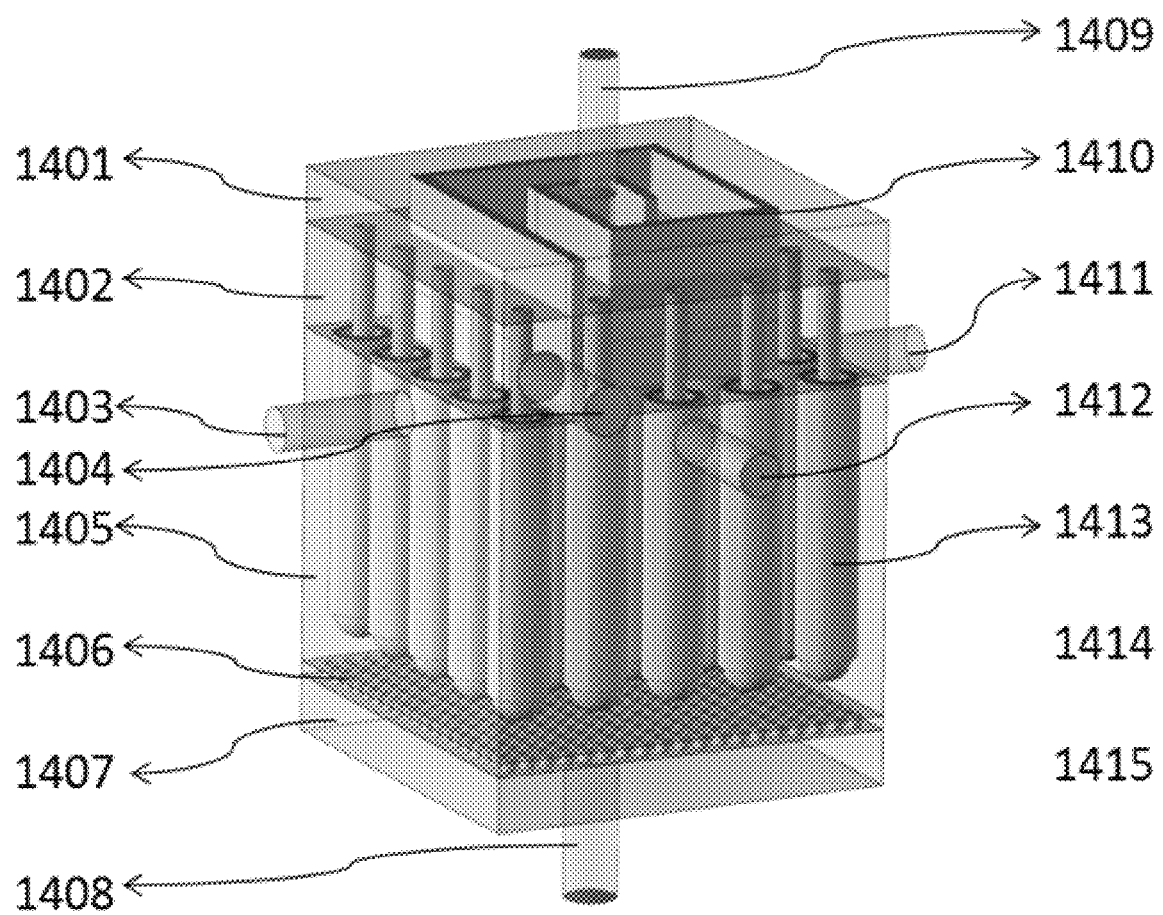
FIG. 4 is a schematic diagram of the structure of the tubular SOFC cell stack according to the present invention.
Figure 5:
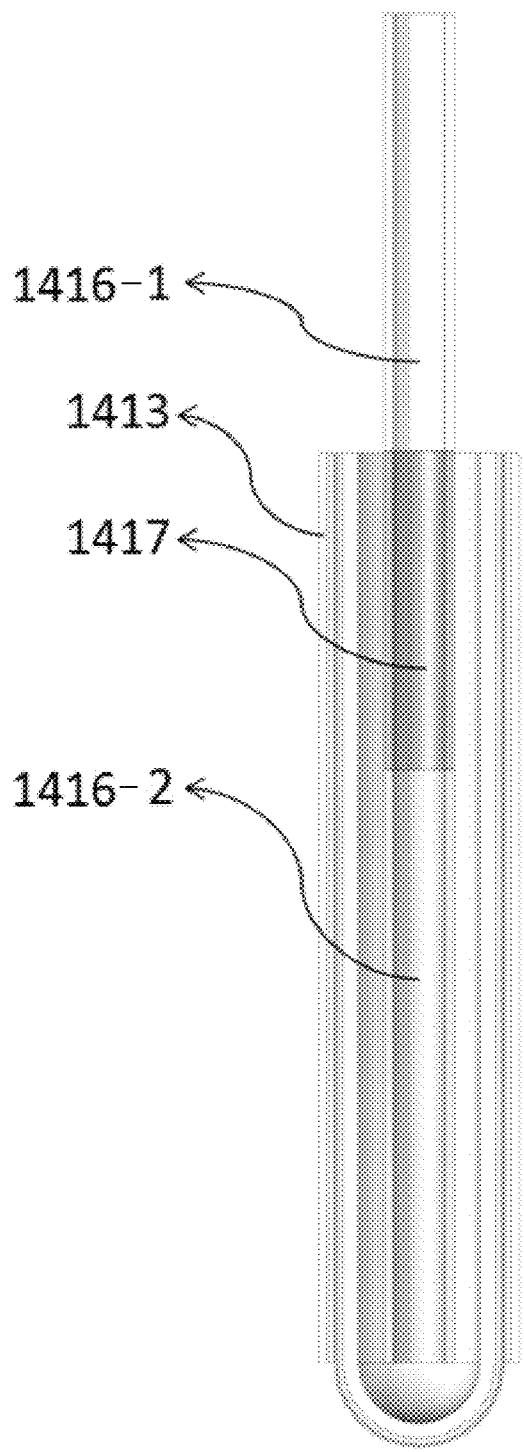
FIG. 5 is a schematic cross-sectional diagram of the tubular SOFC single cell.

The tubular SOFC cell stack 14 further comprises a fuel inlet cavity 1401, a fuel outlet cavity 1402, an air cavity 1405 and an air buffer cavity 1407; an inner pipe 1416 of a tubular SOFC single cell 1413 comprises an upper half part 1416-1 extending beyond the cell reaction zone and a lower half part 1416-2 located within the cell reaction zone (as shown in FIG. 5); the upper half part 1416-1 is located in the fuel inlet cavity 1401; the fuel inlet cavity 1401 is arranged above the fuel outlet cavity 1402, and a fuel outlet pipe 1404 is arranged at the tail end of a corresponding concentric-square-shaped partition plate 1410; the tubular SOFC cell stack 14 further comprises a concentric-square-shaped partition plate 1410 arranged in the fuel inlet cavity 1401 and the fuel outlet cavity 1402, the remaining part of the fuel inlet cavity 1401 and the fuel outlet cavity 1402 are separated by the partition plate, a fuel inlet pipe 1409 is communicated with the central cavity of the concentric-square-shaped partition plate 1410, fuel mixed gas along the concentric-square-shaped partition plate 1410 enters the inner pipe 1416 of each tubular SOFC single cell 1413 and sequentially enters an anode functional layer 1421 to participate in anode electrochemical reaction, and the reacted gas is discharged from a cavity 1418 at an outer side of the inner pipe 1416 and discharged from the fuel outlet pipe 1404 along a concentric-square-shaped flow channel formed by the concentric-square-shaped partition plate 1410, so that the fuel in each single pipe SOFC flows uniformly from the inlet to the outlet, and the fuel distribution in each single pipe is more uniform; a porous partition plate 1406 is arranged between the air buffer cavity 1407 and the air cavity 1405, the air buffer cavity 1407 is communicated with an air inlet pipe 1408, the air cavity 1405 is provided with an air outlet pipe, a cathode functional layer 1423 at an outer side of the tubular SOFC single cell 1413 is located in the air cavity 1405, the air enters the air buffer cavity 1407 from the air inlet pipe 1408 through a flow control valve III 12, the air enters the air cavity 1405 more uniformly to participate in cathode electrochemical reaction under the action of the porous partition plate 1406, and then is discharged from the air outlet pipes 1403, 1411, 1412 at the periphery of the air cavity 1405, and then converges into a heat exchanger II 7.

Figure 6:
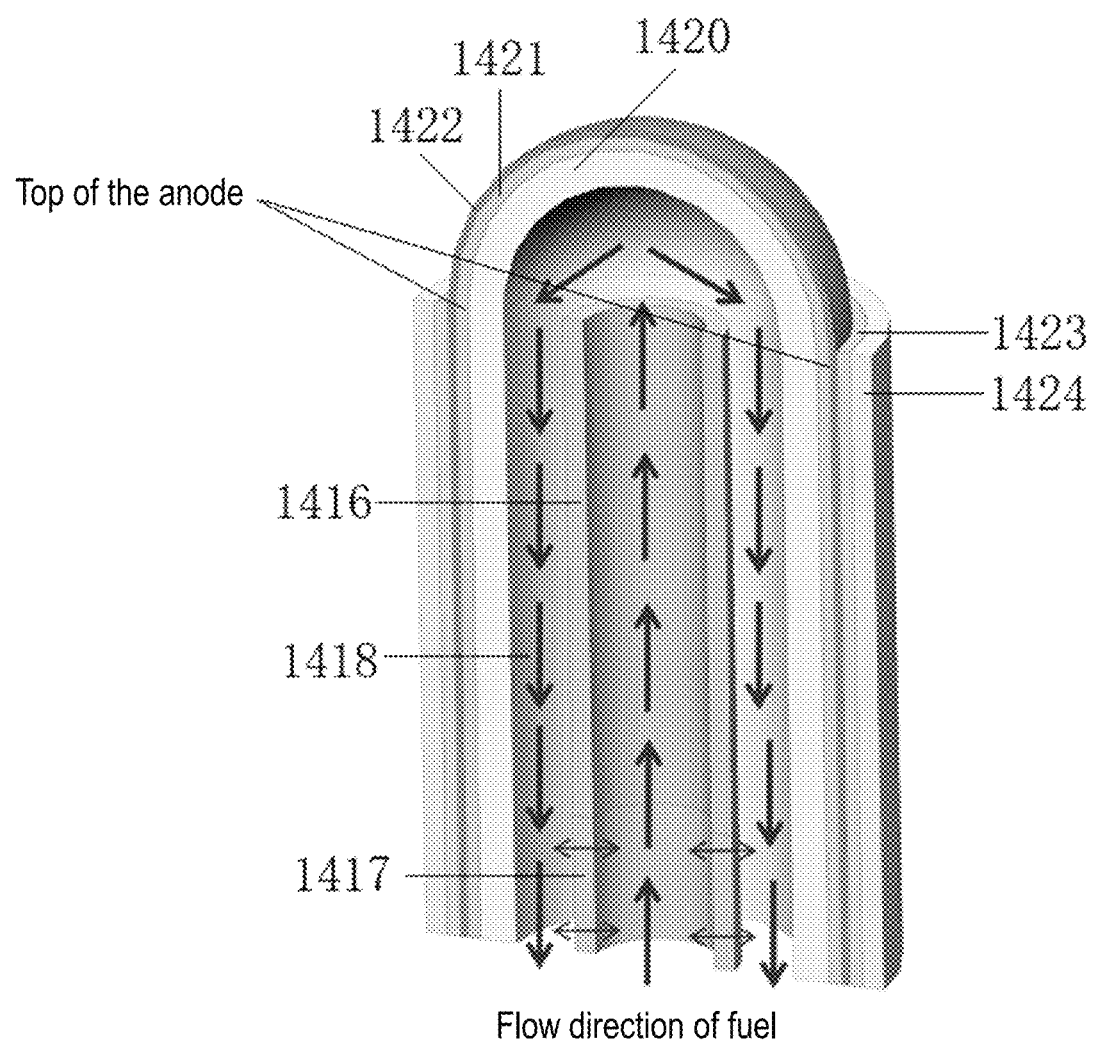
FIG. 6 is a partial cross-sectional diagram of the tubular SOFC single cell.
Figure 7:
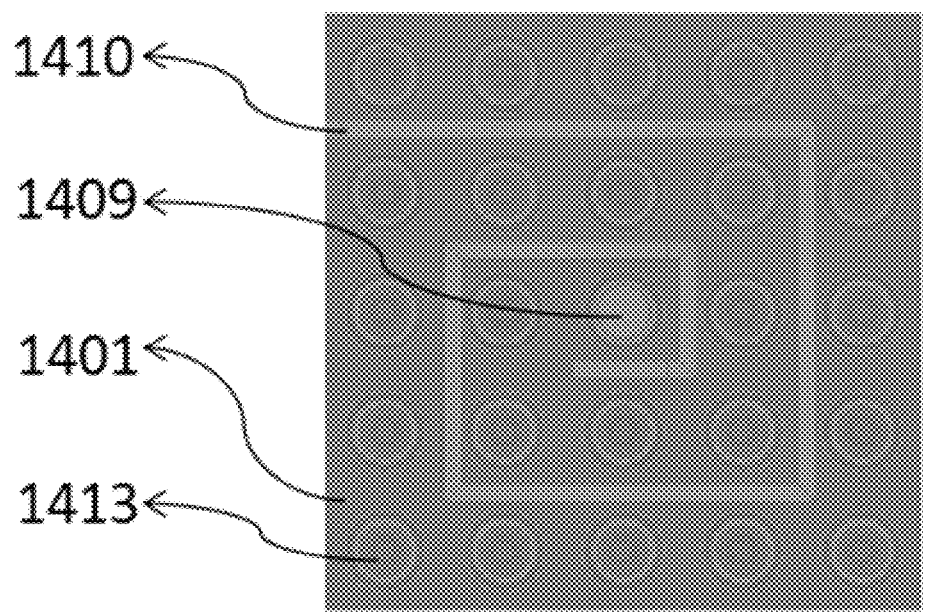
FIG. 7 is a top view of the fuel inlet cavity of the tubular SOFC cell stack.
Figure 8:
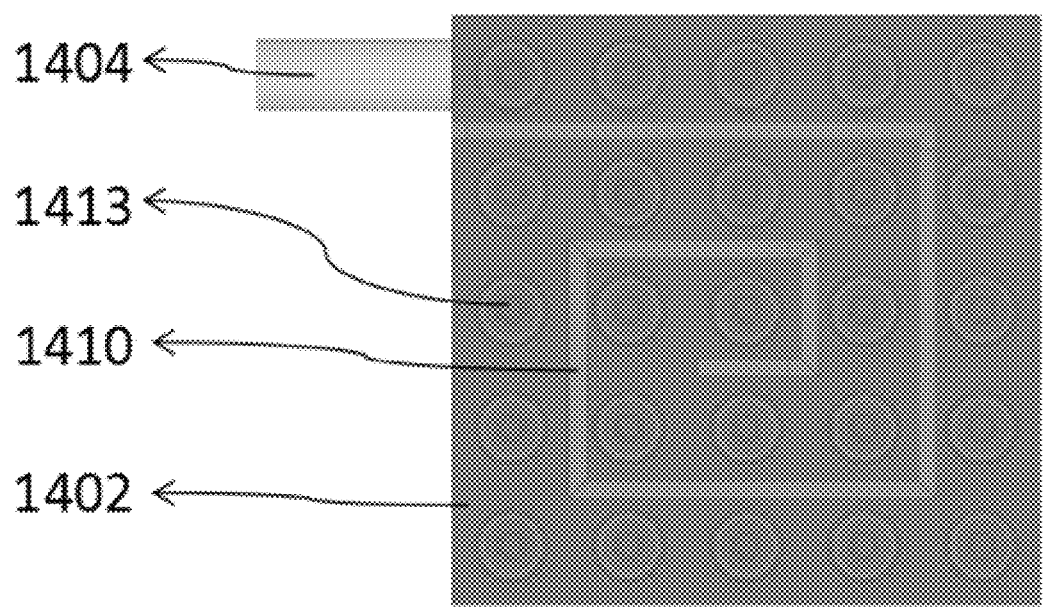
FIG. 8 is a bottom view of the fuel outlet cavity of the tubular SOFC cell stack.
Figure 9:
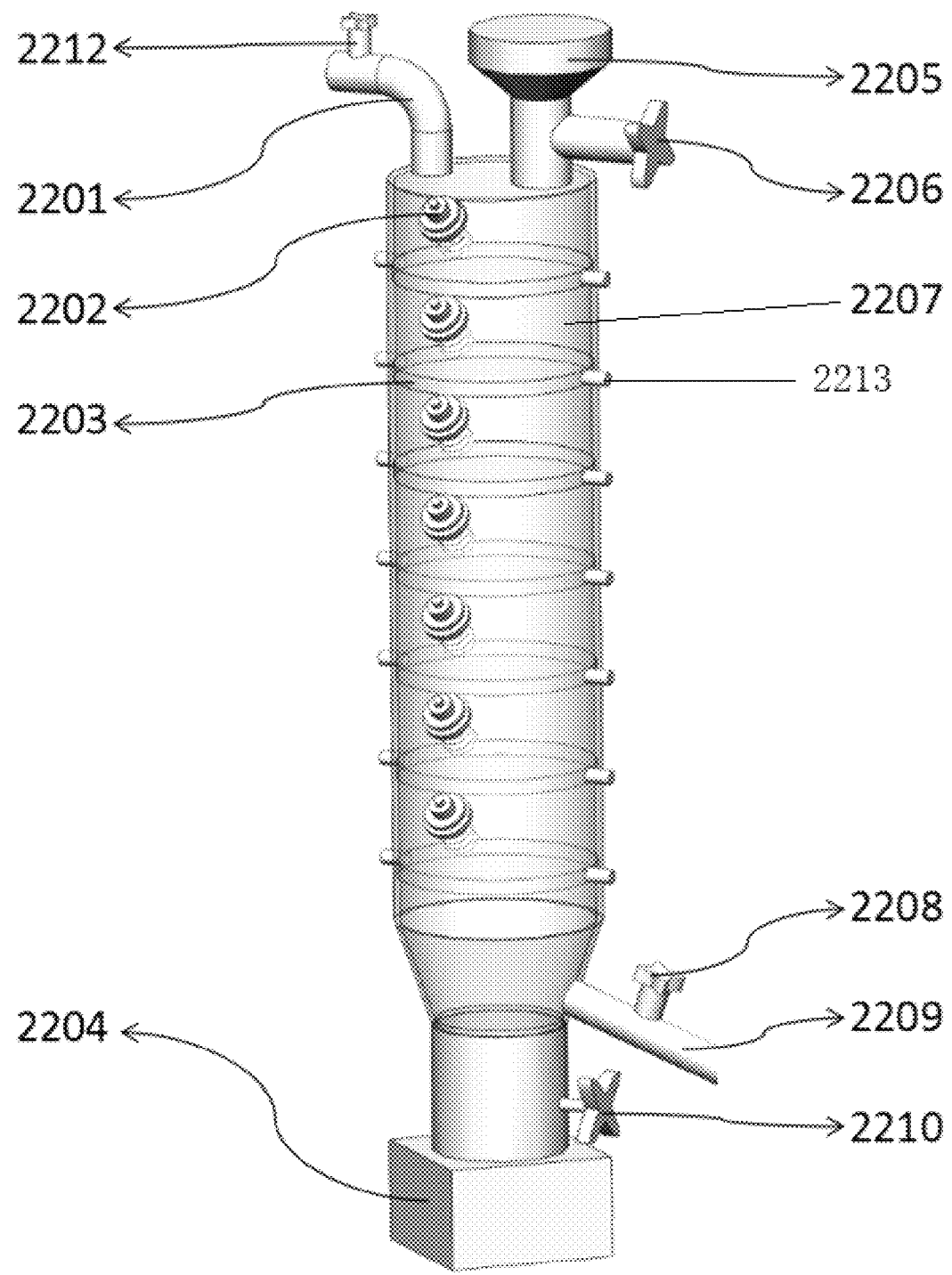
FIG. 9 is a schematic diagram of the structure of the magnesium powder combustion furnace.

The tubular SOFC single cell 1413 is of a tubular structure and sequentially comprises from outside to inside: a cathode supporting layer 1424, a cathode functional layer 1423, an electrolyte layer 1422, an anode functional layer 1421 and an anode supporting layer 1420, wherein the inner pipe 1416 is located in a cavity within the anode supporting layer 1420, and a cavity 1418 formed by a gap between the inner pipe 1416 and the anode supporting layer 1420 is an anode reaction zone, as shown in FIG. 6, the ratio of the length of the inner pipe 1416 located in the cell reaction zone to the length of the side wall pipe with the porous layer is 3:1, i.e., if the lower half part 1416-2 of the inner pipe within the cell reaction zone has a length of 9 cm, the side wall pipe with the porous layer has a length of 3 cm.

The power generation system comprising the methanol solid oxide fuel cell of the present invention comprises a tubular SOFC cell stack 14, a fuel feeding pipeline connected with a fuel inlet of the tubular SOFC cell stack 14, an air feeding pipeline connected with an air inlet of the tubular SOFC cell stack 14, a treatment pipeline for exhaust gas on a fuel side and a heat recovery pipeline for exhaust air on an air side.

Wherein, the fuel feeding pipeline sequentially comprises a methanol tank 1, a primary mixer 4, a methanol evaporator 8, a heat exchanger I 10 and a secondary mixer 11; a water pump I 2 and a flow control valve I 3 are arranged on a connecting pipeline between the methanol tank 1 and the primary mixer 4, water and methanol are mixed by the primary mixer 4 and then pumped into the methanol evaporator 8 through a water pump II 6, the methanol steam obtained by the methanol evaporator 8 is mixed with CO and $H_2$ in the secondary mixer 11 after passing through the heat exchanger I 10, and the mixed fuel enters the tubular SOFC cell stack 14 through a flow control valve II 13; the mixing volume ratio of water to methanol is 1:9 in the primary mixer 4.

Wherein, the methanol evaporator 8 comprises a methanol solution tank 803 connected with an outlet of the primary mixer 4, an air cavity 802 positioned above the methanol solution tank 803 and a methanol steam collecting cavity 805 positioned above the air cavity 802 and separated from the air cavity 802 by a barrier 813, and the air cavity 802 is not communicated with the methanol solution tank 803 and the methanol steam collecting cavity 805; the methanol evaporator 8 also comprises a plurality of rising-film evaporation tubes 808, wherein inlet ends of the rising-film evaporation tubes 808 extend into the methanol solution tank 803, the rising-film evaporation tubes 808 pass through the air cavity 802, and outlet ends of the rising-film evaporation tubes 808 extend into the methanol steam collection cavity 805; the air cavity 802 comprises a hot air inlet 809 and a cold air outlet 801, the hot air inlet 809 is close to the inlet end of the rising-film evaporation tube 808, and the cold air outlet 801 is far away from the inlet end of the rising-film evaporation tube 808; the methanol steam collection cavity 805 comprises a methanol steam outlet 806; the rising-film evaporation pipe 808 comprises a pipe 810 and a porous section 812 inserted into the pipe 810, the upper half part of the porous section 812 is located in the pipe 810, the lower half part of the porous section 812 extends into the methanol solution tank 803, and the upper half part of the porous section 812 is positioned at a position where a hot air inlet 809 is correspondingly arranged on the air cavity 802; an outer side wall of the upper half part of the porous section 812 is provided with annular ribs 811. The annular ribs 811 can increase heat exchange area. The methanol in the methanol solution tank 803 is sucked into the porous section 812 under the action of capillary, the temperature outside the porous section 812 of the tube at the position of the hot air inlet 809 arranged at the lowest layer of the air cavity 802 is highest, and the annular ribs 811 are attached to enhance convection heat exchange; at the moment, the heat exchange area of methanol liquid in the porous section 812 is large, the methanol liquid is more easily boiled and vaporized, the volume of steam is increased at a very high speed, high-speed updraft formed in a pipe core is used for smearing non-vaporized liquid into a film on the pipe wall to flow upwards, a good heat transfer condition is formed, the evaporation is accelerated, and the produced methanol steam enters the heat exchanger I 10 through the methanol steam outlet 806 to be continuously heated. The porous section 812 does not have a hollow pipe structure, and the porous section 812 is a porous layer having a porosity of 0.5, and has a structure similar to a sponge structure in shape, but is hard.

The air cavity 802 is further provided with a plurality of baffles 807 that are parallel to each other and staggered, and a hot air from the heat exchanger II 7 enters the air cavity 802 from the hot air inlet 809, is S-shaped flow in air cavity 802 under the action of baffles 807, finally directly discharges from the cold air outlet 801, which increases flow distance of the hot air in the air cavity 802 and effectively promotes heat exchange efficiency of the methanol evaporator 8.

The air feeding pipeline comprises a blower 5, a heat exchanger II 7 and a heat exchanger III 9, the blower 5 presses air into the heat exchanger II 7 to be preheated, the air enters the heat exchanger III 9 to be continuously heated after passing through the heat exchanger II 7, and the heated air enters the tubular SOFC cell stack 14 through a flow control valve III 12. After reaction, high-temperature air discharged from an air outlet of the tubular SOFC cell stack 14 firstly enters normal-temperature air pressed by heating the blower 5 in a heat exchanger II 7, then enters the methanol evaporator 8 to heat methanol solution, and cooled air is discharged from the cold air outlet 801. The high-temperature air discharged from the air outlet contains only a little oxygen, and can be directly discharged without influence on the environment.

The mixed gas discharged from the fuel side (the tail gas from the fuel side contains $H_2$, CO, $CO_2$ and $H_2O$) firstly enters a heat exchanger III 9 to heat the air in the air feeding pipeline, then enters the heat exchanger I 10 to heat methanol steam, and enters a cooling tower 15 after heat exchange to separate $H_2O$ in the mixed gas, and the separated water is collected by a water tank 18; the water in the water tank 18 may enter the primary mixer 4 through a water pump III 17 and a flow control valve IV 16 to be mixed with methanol; the remaining mixed gas of $CO_2$, CO and $H_2$ is temporarily stored in a gas storage tank 19 and enters a magnesium powder combustion furnace 22 through a flow control valve V 20 after $H_2O$ is separated, wherein $CO_2$ in the mixed gas and magnesium powder are combusted, the heat produced by combustion is used for generating electricity for Stirling engine, and the mixed gas of CO and $H_2$ discharged after combustion is introduced into the secondary mixer 11 to be mixed with the methanol steam, so that the recycling of residual fuel is realized.

The magnesium powder combustion furnace 22 comprises a reaction cavity consisting of a plurality of layers of combustion chambers 2207, a spark plug 2202 is arranged within each layer of combustion chamber 2207, adjacent layers of combustion chambers 2207 are separated by a porous partition plate 2203, the porous partition plate 2203 is connected with rotating shafts 2213 passing through out of a side wall of the combustion chamber 2207, the rotating shaft 2213 is fixedly connected with the side wall of the combustion chamber 2207 through a bearing, and the rotating shaft 2213 can realize the rotation of the porous partition plate 2203, so that the porous partition plate is in a horizontal placement state, i.e., a closed state, or is obliquely placed with the horizontal plane, i.e., an opened state; the top of the reaction cavity is provided with a magnesium powder feeding inlet 2205 and an air outlet 2201, a valve I 2206 is arranged at the feeding inlet 2205, and a valve IV 2212 is arranged at the air outlet 2201; the bottom of the reaction cavity is provided with a powder recovery tank 2204, a valve III 2210 is arranged between the reaction cavity and the powder recovery tank 2204, a mixed gas inlet 2209 is arranged on a side wall of the lower portion of the reaction cavity, and a valve II 2208 is arranged at the mixed gas inlet 2209. The porous partition plate 2203 is air-permeable and powder-impermeable; in the embodiment, crude magnesium particles with a particle size of 1-3 mm are used, and the porous partition 2203 has an aperture of larger than 3 mm.

The magnesium powder combustion furnace 22 used in the embodiment adopts 7 layers of combustion chambers, which are sequentially a first layer of combustion chamber, a second layer of combustion chamber, a third layer of combustion chamber, a fourth layer of combustion chamber, a fifth layer of combustion chamber, a sixth layer of combustion chamber and a seventh layer of combustion chamber from top to bottom.

A first unloading process of the magnesium powder combustion furnace 22 comprises the steps as follows: opening porous partition plates of the first, second and third layers of combustion chambers, opening the control valve 2206 of a magnesium powder unloading device and pouring sufficient Mg powder on the porous partition plate of the fourth layer of combustion chamber; closing the porous partition plate of the third layer of combustion chamber, and pouring the same amount of Mg powder onto the porous partition plate of the third layer of combustion chamber; closing the porous partition plate of the second layer of combustion chamber, and pouring the same amount of Mg powder onto the porous partition plate of the second layer of combustion chamber; closing the porous partition plate of the first layer of combustion chamber, and pouring the same amount of Mg powder onto the porous partition plate of the first layer of combustion chamber. The gas inlet pipeline valve 2208 is opened, the mixed gas of CO, $H_2$ and $CO_2$ enters the magnesium powder combustion furnace 22 from the mixed gas inlet 2209 at the lower part, the mixed gas moves upwards through the porous partition 2203 under the action of gas pressure, powder mixtures on the porous partition plate 2203 is blew to make the powder and the mixed gas fully mix, combustion occurs by igniting the spark plug 2202, the content of $CO_2$ in the mixed gas from bottom to top is gradually reduced, the mixed gas firstly contacts Mg powder in the fourth layer of combustion chamber for violent combustion reaction, and the incompletely reacted $CO_2$ enters the third layer of combustion chamber through the porous partition plate of the third layer of combustion chamber for continuously reacting; when there is combustion in the second layer of combustion chamber, the gas inlet pipeline valve 2208 is closed to ensure that there is no combustion in the first layer of combustion chamber, which indicates that there is no $CO_2$ in the discharged mixed gas; and the reaction is performed until the combustion in each layer ends.

The subsequent uploading process comprises the steps as follows: rotating the porous partition plate of the fourth layer of combustion chamber, pouring the powder onto the porous partition plate of the fifth layer of combustion chamber, and closing the porous partition plate of the fourth layer of combustion chamber; rotating the porous partition plate of the third layer of combustion chamber, pouring the powder onto the porous partition plate of the fourth layer of combustion chamber, and closing the porous partition plate of the third layer of combustion chamber; rotating the porous partition plate of the second layer of combustion chamber, pouring the powder onto the porous partition plate of the third layer of combustion chamber, and closing the porous partition plate of the second layer of combustion chamber; rotating the porous partition plate of the first layer of combustion chamber, pouring the powder onto the porous partition plate of the second layer of combustion chamber, and closing the porous partition plate of the first layer of combustion chamber; opening the control valve 2206 of the magnesium powder uploading device, and pouring the same amount of Mg powder onto the porous partition plate of the first layer combustion chamber. Thus, a complete unloading process is finished. The gas inlet pipeline valve 2208 is opened, combustion occurs by igniting until there is combustion again in the second layer of combustion chamber, the air inlet pipeline valve 2208 is closed to wait for the end of the combustion, and the process is repeated.

The MgO/C powder recovery mechanism is as follows: when there is combustion in the middle combustion chamber and no combustion in the lower combustion chamber, it is indicated that the Mg powder has completely combusted in the lower combustion chamber to form the MgO/C mixture. During the next uploading process, all the porous partition plates 2203 under the combustion chamber without combustion are opened directly, and the MgO/C powder is poured directly into the recovery tank 2204, and the above uploading process is repeated.

Figure 10:
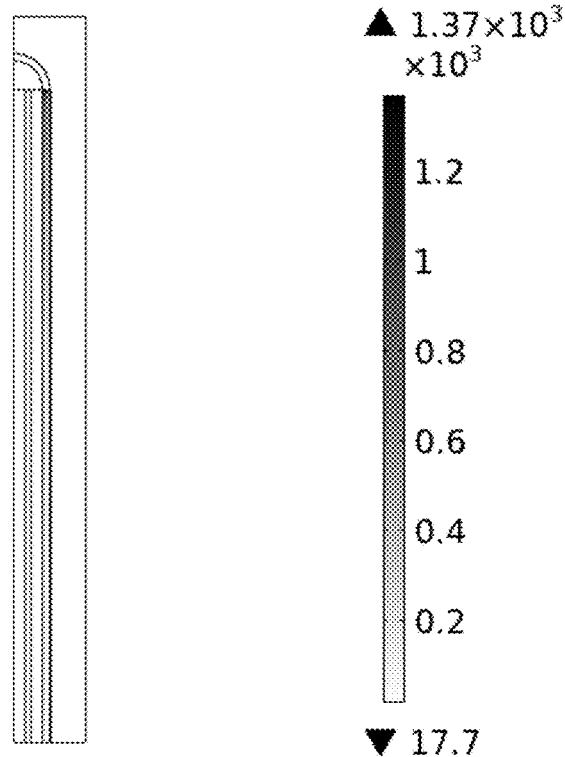
FIG. 10 is a schematic diagram of the activity of anode carbon deposition when the side wall of the inner pipe of the tubular SOFC single cell at the fuel inlet is a closed structure without a through hole.
Figure 11:
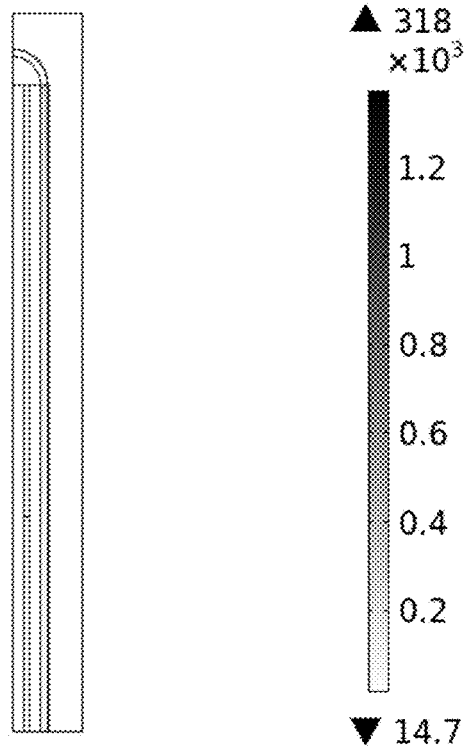
FIG. 11 is a schematic diagram of the activity of anode carbon deposition when the side wall of the inner pipe of the tubular SOFC single cell at the fuel inlet is provided with a through-hole structure.

It can be known from FIGS. 10-11 by comparison that a porous layer is added at the fuel inlet of the inner pipe, so that too high carbon deposition activity in the anode zone at the top of the cell is effectively relieved. Because the concentration of methanol entering the round bottom part of the tubular SOFC is reduced, the methanol decomposition reaction rate is reduced, the heat absorption is reduced, the temperature drop is reduced (the lowest temperature of the low-temperature zone at the top of the anode is increased), and the maximum volume fraction of CO is reduced, the carbon deposition activity is obviously reduced while the overall temperature difference of the cell is reduced, and the carbon deposition is relieved. Although the methanol decomposition rate is reduced, the current density is not reduced but improved due to the increase of the average temperature of the cell.

Figure 12:
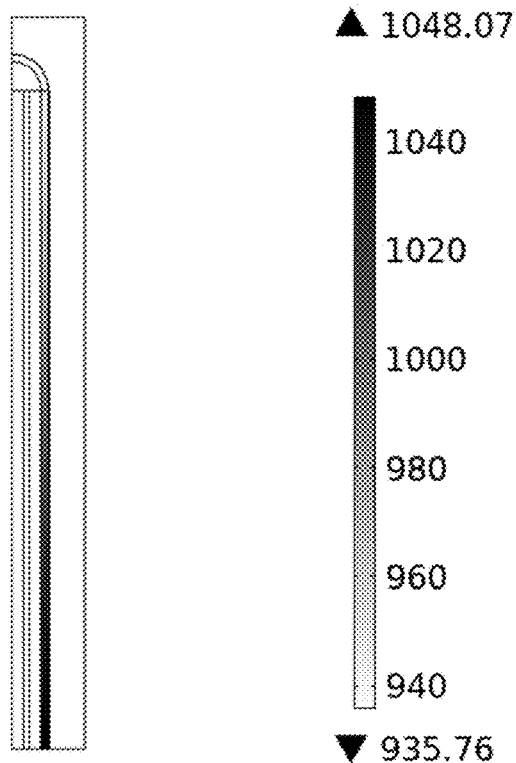
FIG. 12 is a schematic diagram of cell temperature distribution when the side wall of the inner pipe of the tubular SOFC single cell at the fuel inlet is a closed structure without a through hole.
Figure 13:
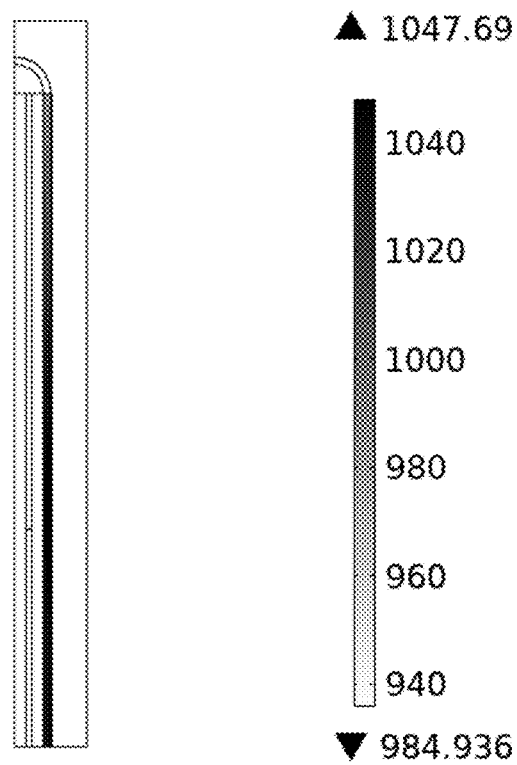
FIG. 13 is a schematic diagram of cell temperature distribution when the side wall of the inner pipe of the tubular SOFC single cell at the fuel inlet is provided with a through-hole structure.

It can be known from FIGS. 12-13 by comparison, the inner wall surface of the inner pipe of the tubular SOFC single cell is coated with a layer of methanol pyrolysis catalyst, and the thickness of the catalyst layer gradually increases from top to bottom. After entering the inner pipe, methanol undergoes pyrolysis reaction under the action of a methanol pyrolysis catalyst, the methanol concentration is gradually reduced, the reaction rate of the methanol on the surface of the whole inner pipe is balanced by gradually increasing the thickness of the catalyst layer, and a low-temperature zone formed by absorbing heat through the decomposition of the high-concentration methanol on the round bottom part of the tubular SOFC is avoided, so that the objectives of reducing the temperature difference of the cell, relieving carbon deposition and improving cell performance are realized.

Figure 14:
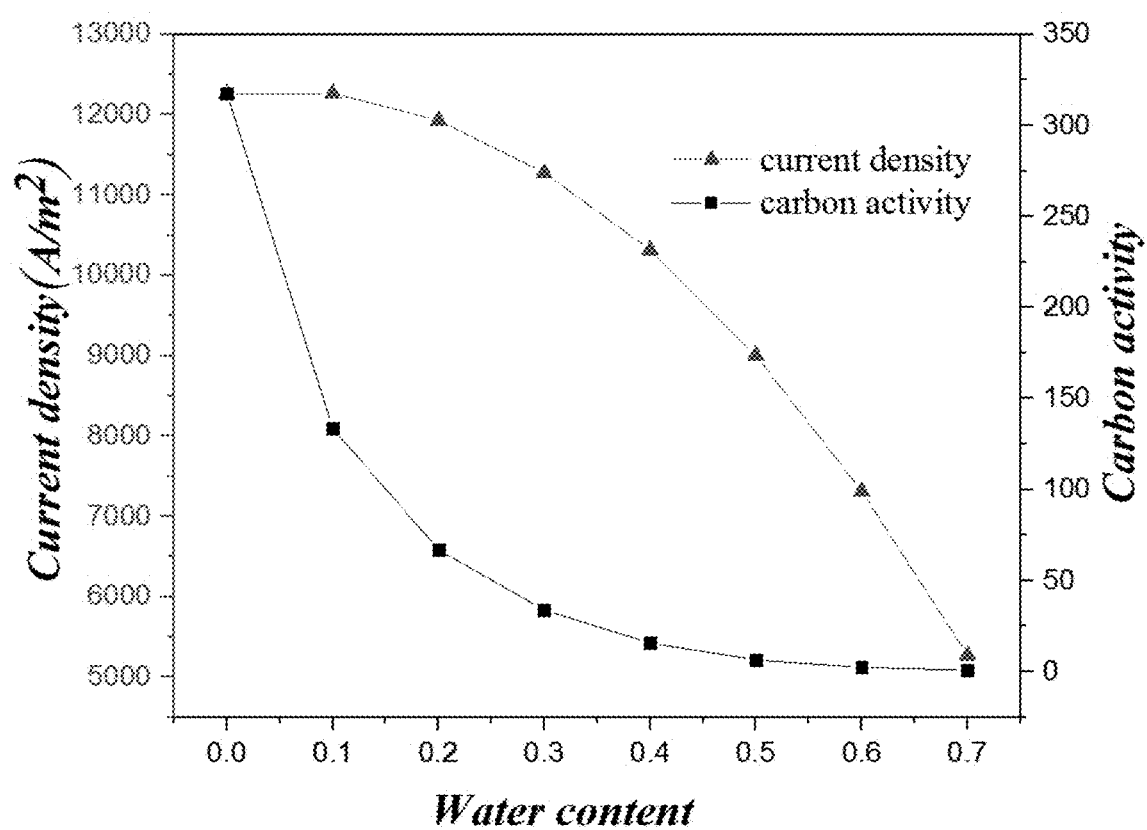
FIG. 14 is a schematic diagram showing the effect of water content in methanol on cell performance and carbon deposition activity when the side wall of the inner pipe of the tubular SOFC single cell at the fuel inlet is provided with a through-hole structure.

It is illustrated from FIG. 14 that the higher the water content is, the lower the carbon deposition activity of the SOFC is; on one hand, $H_2O$ effectively inhibits carbon deposition reaction, on the other hand, $H_2O$ can undergo water-gas shift reaction with CO, which consumes CO, produces $CO_2$ and releases heat, and $CO_2$ effectively inhibits the carbon deposition reaction. The current density of SOFC surface generally tends to decrease with the increase of water content in the initial fuel, which is readily understood that the increase of water content means the decrease in available fuel and, therefore, the decrease in current density. However, when the water content is 10%, the current density of SOFC surface is slightly increased. The maximum and minimum temperatures of SOFC anode with water content of 10% are 30 K higher than the cells using pure methanol fuel, because $H_2O$ dilutes methanol concentration, the methanol decomposition reaction rate is reduced, and the absorbed heat is reduced; and because the water in the initial fuel promotes the water-gas shift reaction at the top of the anode, i.e., exothermic reaction. Therefore, the carbon deposition activity can be greatly reduced on the premise of ensuring the performance of the cell by mixing a small amount of $H_2O$ in the initial fuel methanol.

What is claimed is:

1. A methanol solid oxide fuel cell, wherein the fuel cell is a tubular SOFC cell stack (14), the tubular SOFC cell stack (14) comprises a plurality of tubular SOFC single cells (1413), and a side wall of an inner pipe (1416) of the tubular SOFC single cell (1413) at a fuel inlet is of a porous layer structure (1417).

2. The methanol solid oxide fuel cell according to claim 1, wherein an inner wall of the inner pipe (1416) is coated with a methanol pyrolysis catalyst layer, and a thickness of the methanol pyrolysis catalyst layer gradually increases along a moving direction of a fuel in the inner pipe.

3. The methanol solid oxide fuel cell according to claim 1, wherein the tubular SOFC cell stack (14) further comprises a fuel inlet cavity (1401), a fuel outlet cavity (1402), an air cavity (1405) and an air buffer cavity (1407); the fuel inlet of the inner pipe (1416) of the tubular SOFC single cell (1413) extends into the fuel inlet cavity (1401); the fuel inlet cavity (1401) is arranged above the fuel outlet cavity (1402), and a fuel outlet pipe (1404) is arranged at a tail end of a corresponding concentric-square-shaped partition plate (1410); the methanol solid oxide fuel cell further comprises the concentric-square-shaped partition plate (1410), a fuel inlet pipe (1409) is communicated with a central cavity of the concentric-square-shaped partition plate (1410), fuel mixed gas along the concentric-square-shaped partition plate (1410) enters the inner pipe (1416) of each tubular SOFC single cell (1413) and sequentially enters an anode functional layer to participate in an anode electrochemical reaction, and a reacted gas is discharged from a cavity (1418) at an outer side of the inner pipe (1416) and discharged from the fuel outlet pipe (1404) along a concentric-square-shaped flow channel formed by the concentric-square-shaped partition plate (1410); a porous partition plate (1406) is arranged between the air buffer cavity (1407) and the air cavity (1405), the air buffer cavity (1407) is communicated with an air inlet pipe (1408), the air cavity (1405) is provided with an air outlet pipe, a cathode functional layer at an outer side of the tubular SOFC single cell (1413) is located in the air cavity (1405), and air uniformly enters the air cavity (1405) to participate in a cathode electrochemical reaction and then is discharged from the air outlet pipe at a periphery of the air cavity (1405).

4. A power generation system comprising the methanol solid oxide fuel cell according to claim 1, comprising: the tubular SOFC cell stack (14); a fuel feeding pipeline connected with the fuel inlet of the tubular SOFC cell stack (14); an air feeding pipeline connected with an air inlet of the tubular SOFC cell stack (14); a treatment pipeline for exhaust gas on a fuel side; and a heat recovery pipeline for exhaust air on an air side.

5. The power generation system according to claim 4, wherein the fuel feeding pipeline sequentially comprises a methanol tank (1), a primary mixer (4), a methanol evaporator (8), a heat exchanger I (10) and a secondary mixer (11); a water pump I (2) and a flow control valve I (3) are arranged on a connecting pipeline between the methanol tank (1) and the primary mixer (4), water and methanol are mixed by the primary mixer (4) and then pumped into the methanol evaporator (8) through a water pump II (6), a methanol steam obtained by the methanol evaporator (8) is mixed with CO and $H_2$ in the secondary mixer (11) after passing through the heat exchanger I (10), and the mixed fuel enters the tubular SOFC cell stack (14) through a flow control valve II (13); a mixing volume ratio of water to methanol is 1:9 in the primary mixer (4).

6. The power generation system according to claim 5, wherein the methanol evaporator (8) comprises a methanol solution tank (803) connected with an outlet of the primary mixer (4), an air cavity (802) positioned above the methanol solution tank (803) and a methanol steam collecting cavity (805) positioned above the air cavity (802) and separated from the air cavity (802) by a barrier (813); the methanol evaporator also comprises a plurality of rising-film evaporation tubes (808), wherein inlet ends of the rising-film evaporation tubes (808) extend into the methanol solution tank (803), the rising-film evaporation tubes (808) pass through the air cavity (802), and outlet ends of the rising-film evaporation tubes (808) extend into the methanol steam collection cavity (805); the air cavity (802) comprises a hot air inlet (809) and a cold air outlet (801), the hot air inlet (809) is close to the inlet end of the rising-film evaporation tube (808), and the cold air outlet (801) is far away from the inlet end of the rising-film evaporation tube (808); the methanol steam collection cavity (805) comprises a methanol steam outlet (806); the rising-film evaporation pipe (808) comprises a pipe (810) and a porous section (812) inserted into the pipe (810), an upper half part of the porous section (812) is located in the pipe (810), a lower half part of the porous section (812) extends into the methanol solution tank (803), and the upper half part of the porous section (812) is positioned at a position where a hot air inlet (809) is correspondingly arranged on the air cavity (802); an outer side wall of the upper half part of the porous section (812) is provided with an annular ribs (811).

7. The power generation system according to claim 4, wherein the air feeding pipeline comprises a blower (5) and at least a primary heat exchanger, the blower (5) presses air into multi-stage heat exchangers connected in series for continuously heating the air, and the heated air enters the tubular SOFC cell stack (14) through a flow control valve III (12).

8. The power generation system according to claim 4, wherein the mixed gas discharged from the fuel side firstly enters a heat exchanger III (9) to heat the air in the air feeding pipeline, then enters the heat exchanger I (10) to heat the methanol steam, and enters a cooling tower (15) after heat exchange to separate $H_2O$ in the mixed gas, the remaining mixed gas of CO, $CO_2$ and $H_2$ enters a magnesium powder combustion furnace (22) after $H_2O$ is separated, wherein $CO_2$ and magnesium powder are combusted, and the mixed gas of CO and $H_2$ discharged after combustion is introduced into the secondary mixer (11) to be mixed with the methanol steam.

9. The power generation system according to claim 8, wherein the magnesium powder combustion furnace (22) comprises a reaction cavity consisting of a plurality of layers of combustion chambers (2207), a spark plug (2202) is arranged within each layer of combustion chamber (2207), adjacent layers of combustion chambers (2207) are separated by a porous partition plate (2203), the porous partition plate (2203) is connected with rotating shafts (2213) passing through out of a side wall of the combustion chamber (2207), and the rotating shaft (2213) is fixedly connected with the side wall of the combustion chamber (2207) through a bearing; a top of the reaction cavity is provided with a magnesium powder feeding inlet (2205) and an air outlet (2201); a bottom of the reaction cavity is provided with a powder recovery tank (2204) and a mixed gas inlet (2209).

10. The power generation system according to claim 4, wherein, after the reaction, the high-temperature air discharged from an air outlet of the tubular SOFC cell stack (14) firstly enters normal-temperature air pressed by heating a blower (5) in a heat exchanger II (7), then enters an methanol evaporator (8) to heat a methanol solution, and the cooled air is discharged from a cold air outlet (801).

\* \* \* \* \*